(12) United States Patent
Saisan (10) Patent No.: US 7,881,916 B1
(45) Date of Patent: Feb. 1, 2011

(54) PRECISION SHAPE SENSING OF ELASTICALLY DEFORMABLE MATERIALS

(75) Inventor: Payam Saisan, Santa Monica, CA (US)

(73) Assignee: HRL Laboratories, LLC, Malibu, CA (US)

(*) Notice: Subject to any disclaimer, the term of this patent is extended or adjusted under 35 U.S.C. 154(b) by 448 days.

(21) Appl. No.: 11/986,676

(22) Filed: Nov. 21, 2007

Related U.S. Application Data (60) Provisional application No. 60/866,813, filed on Nov. 21, 2006.

(51) Int. Cl.
- G06F 17/50 (2006.01)
- G06F 19/00 (2006.01)
- G06G 7/48 (2006.01)
- G05B 13/02 (2006.01)

(52) U.S. Cl. ............ 703/6; 703/1; 703/3; 700/30; 700/31; 700/98

(58) Field of Classification Search ............ 703/1, 703/3, 6; 700/30, 31, 98
See application file for complete search history.

(56) References Cited

U.S. PATENT DOCUMENTS 5,531,407 A * 7/1996 Austin et al. ............ 244/219

OTHER PUBLICATIONS

N.I. Akhiezer and I.M. Glazman, "Theory of linear operators in Hilbert Spaces," Frederick Ungar Publisher, 1966.

G.H. Golub and C.F. Van Loan, "Matrix Computations," The John Hopkins University Press, p. 601, 1996.

P. Saisan, A. Bissacco, A. Chiuso, and S. Soatto, "Modeling and synthesis of facial motion driven by speech," Proceedings of ECCV, Prague, 2004.

G. Chanan, D.G. Mac Martin, J. Nelson, T. Mast, "Control and alignment of segmented mirror telescopes: matrices, modes, and error propagation," Applied Optics, vol. 43, No. 6, Feb. 2004.

M.A. van Dam, R. G. Lane, "Extended analysis of curvature sensing," J. Opt. Soc. Am. A 19, 13901397, 2002.

Curvature and diffeomorphism discussions from http://en.wikipedia.org.

* cited by examiner

*Primary Examiner*—David Silver
(74) *Attorney, Agent, or Firm*—Tope-McKay & Assoc

(57) ABSTRACT

The present invention provides a method and apparatus for sensing and determining the shapes of deformable materials, shaped by a plurality of actuators, using sparse sensor network topologies. The method comprises placing a plurality of curvature sensors on the surface of a deformable material to measure the local curvatures of the deformable material. The plurality of curvature sensors generate a collection of sensor data correlated to the local curvatures. Actuator parameters are generated from sensor data by assuming linear approximation between sensors data and actuator parameters. The shape of the deformable material is determined from the generated actuator parameters.

14 Claims, 9 Drawing Sheets

PRECISION SHAPE SENSING OF ELASTICALLY DEFORMABLE MATERIALS

PRIORITY CLAIM

The present application is a non-provisional patent application, claiming the benefit of priority of U.S. Provisional Patent Application No. 60/866,813, filed Nov. 21, 2006, titled, "Method For Precision Shape Sensing Of Elastically Deformable Materials."

CROSS-REFERENCE

This application is related to co-pending U.S. Application No. 60/866,813, titled "Method and Apparatus for Optimal Placement of Actuators for Shaping Deformable Materials into Desired Target Shapes," filed on Nov. 21, 2006, which is incorporated herein by reference in its entirety.

BACKGROUND OF THE INVENTION (1) Technical Field

This invention generally relates to the field of sensing an elastically deformed surface. More specifically a method of dynamically monitoring a shape while it is being actively deformed.

(2) Background

The problem of deformable material shape control and sensing has been studied most widely in the context of adaptive optics and segmented mirror telescopes using brute force approximations and sub-optimal over-engineering approaches for placement of and sensors and actuators. See, for example, G. Chanan, D. G. Mac Martin, J. Nelson, T. Mast, Control and Alignment of Segmented Mirror Telescopes: Matrices, Modes, and Error Propagation, Applied Optics, Vol. 43, No. 6, February 2004; and M. A. Van Dam, R. G. Lane, Extended Analysis of Curvature Sensing, J. Opt. Soc. Am. A 19, 13901397, 2002.

Conventional methods for shape sensing of deformable materials involve dense surface shape sensing. In order to achieve dense surface shape sensing, one has to resort to either dense range sensing or photogrammetric methods that reconstruct the three-dimensional (3-D) shape of a surface from stereoscopic views of the surface shape. These methods require high dimensional sensor information. Both range: scanning and 3-D stereoscopic photogrammetry require costly equipment, dense sensing structures and computationally expensive sensor data processing stage.

For the foregoing reasons, there is a need for a system that is capable of precision shape sensing with minimal system complexity. Furthermore, there is a need for a sensing paradigm that allows for real-time sensing of 3-D shapes with only a sparse set of simple sensors.

SUMMARY OF THE INVENTION

A number of important improvements have been discovered in the field of precision shape sensing both during and subsequent to deformation which overcome the aforementioned shortcomings in the art. These discoveries can also be utilized in equivalent and related fields, where the same or similar principals of precise shape sensing may be used to map the topology of a material in one-dimensional, two-dimensional, and three-dimensional spaces.

The discovered improvements enable sensing of any continuous surface shape (conceptually, an infinite dimensional construct) using a finite (sparse) number of simple strain sensors attached to the surface of an elastically deformable material. In one embodiment, the proposed sensing paradigm drastically reduces the number and ultimately the cost for a sensing system used to determine the 3-D shape of elastic material undergoing elastic deformations. In another embodiment, the sensing paradigm allows for real-time sensing of 3-D shapes with a sparse number of relatively inexpensive and widely available sensors, such as strain gauges, mounted on the deformable surface.

In one aspect, the present invention comprises a method for discerning a shape of a deformable material being deformed by a plurality of actuators, the method comprising acts of: using a set of partial differential equations to describe the physical behavior of a deformable material as a function of the deformable material's interaction with at least one external force; relating the point of contact between a sensor and the deformable material to determine the local geometry of the deformable material at the point of contact; generating a plurality of actuator parameter values from the sensor data by assuming linear approximation between the collection of sparse strain sensor data and the plurality of actuator parameter values; and predicting the shape of the deformable material from the actuator parameter values.

In another aspect, the set of partial differential equations are derived from elasticity equations.

In another aspect, the method further comprises an act of adjusting the point of contact of the sensor along the surface of the deformable material to generate a collection of sparse strain sensor data.

In yet another aspect, the method further comprises an act of utilizing a finite element method to determine a local geometry of the deformable material at the point of contact.

In another aspect, the method further comprises an act of disposing a sensor onto a surface of a deformable material at a point of contact.

The present invention comprises a computer program product for discerning the shape of a deformable material, the computer program product comprising computer-readable instruction means stored on a computer-readable medium that are executable by a computer for causing the computer to: dispose a sparse strain sensor onto a surface of a deformable material at a point of contact; relate the point of contact between the sparse strain sensor and the deformable material to determine a local geometry of the deformable material at the point of contact; adjust the point of contact of the sparse strain sensor along the surface of the deformable material to generate a collection of sparse strain sensor data; generate a plurality of actuator parameter values from the sensor data by assuming linear approximation between the collection of sparse strain sensor data and the plurality of actuator parameter values; and predict the shape of the deformable material from the actuator parameter values.

In another aspect, the computer program product further comprises an act of utilizing a finite element method to determine a local geometry of the deformable material at the point of contact.

In another aspect, the computer program product further comprises an act of dispose a sparse strain sensor onto a surface of a deformable material at a point of contact.

In another aspect, the present invention comprises an apparatus for discerning a shape of a deformable material being deformed by a plurality of actuators, the apparatus comprising: a means for securing a deformable material; a plurality of actuators for disposing upon a surface of the deformable material; a plurality of curvature sensors at least equal in quantity to the plurality of actuators, the plurality of curvature sensors configured to measure a local geometry of the deformable material; a computing apparatus configured to receive data from the plurality of curvature sensors and to process the data to determine the shape of the deformable material.

In another aspect, the apparatus further comprises an actuator control box configured to adjust the point of contact of the plurality of actuators.

In yet another aspect, the actuator control box is further configured to transmit positional information of the plurality of actuators to the computing apparatus.

In yet another aspect, the apparatus further comprises the plurality of curvature sensors are strain gauges.

BRIEF DESCRIPTION OF THE DRAWINGS

The objects, features and advantages of the present invention will be apparent from the following detailed descriptions of the disclosed aspects of the invention in conjunction with reference to the following drawings, where.

DETAILED DESCRIPTION

The present invention satisfies the long felt need for an inexpensive and precise way of sensing the shape of an elastically deformable material in three-dimensional (3-D). Sensors applied to the surface of an elastic material are used to generate information related to the local and/or regional compression and/or expansion of a material undergoing the deformation. During deformation, information is collected from the actuators actively deforming the elastic material. Information collected from the materials may include the x, y, and z positional information of the actuators. The latest theoretical findings in shape theory and shape learning for elastically deformable materials are combined with the information received from the actuators and sensors and are applied to the precision shape sensing.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 108, Paragraph 6. In particular, the use of "step of" or "act of" in the claims herein is not intended to invoke the provisions of 35 U.S.C. 108, Paragraph 6.

Below, an introduction to the present invention is provided to give an understanding of the specific aspects. Then experimental results are presented which demonstrate the suitability of the present method in predicting the shape of an elastically deformable beam undergoing deformations using linear actuators. Finally, specific embodiments of the present invention are provided.

(1) INTRODUCTION

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of layers and other elements shown in the accompanying drawings may be exaggerated to more clearly show the details. The present invention should not be construed as being limited to the dimensional relations shown in the drawings, nor should the individual elements shown in the drawings be construed to be limited to the dimensions shown.

Figure 1:
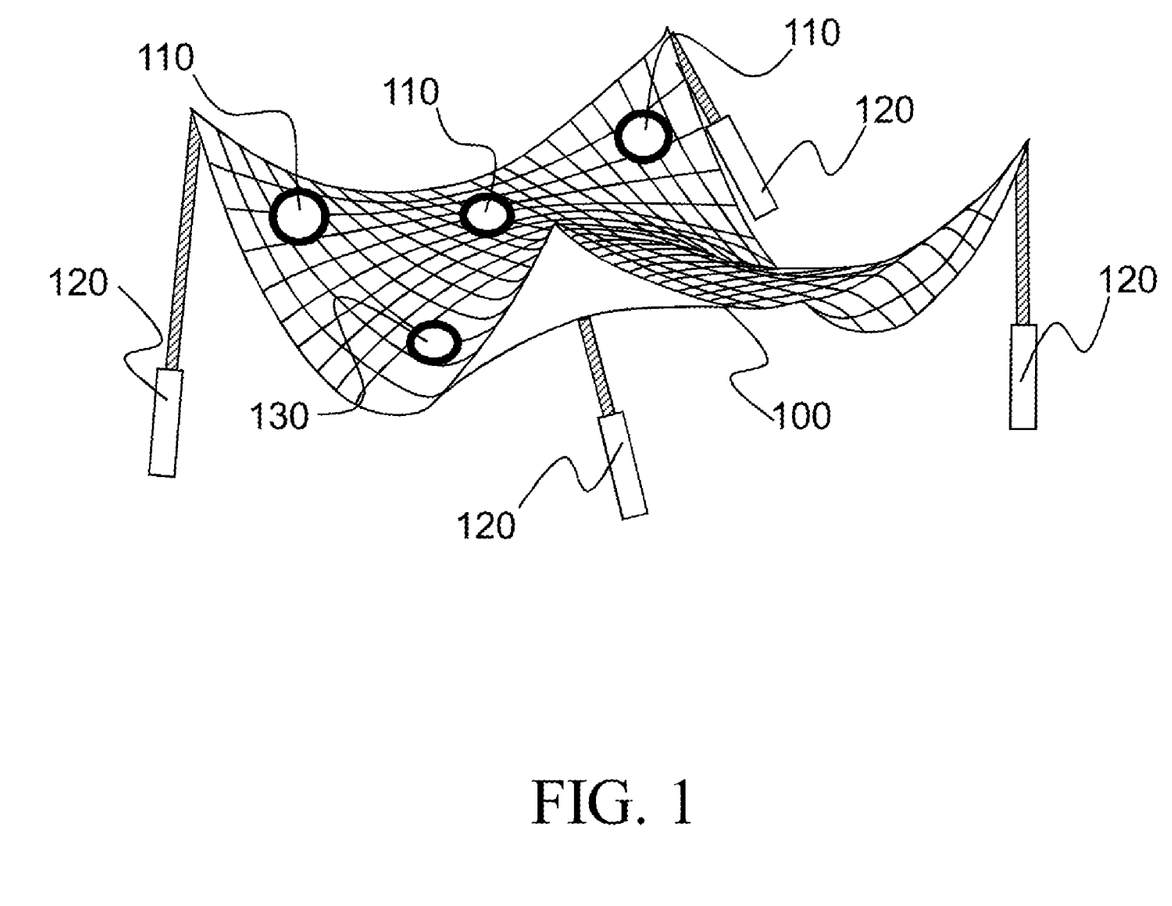
FIG. 1 is an illustration depicting an exemplary deformable material shaped by a network of actuators.

Referring to FIG. 1, an elastically deformable material 100 is shown. A variety of materials 100 which may be described by elasticity equations are suitable for precision shape sensing. Solutions to elasticity equations along with boundary conditions are used to define the shape of the planar surface of the material 100. Non-limiting exemplary deformable materials 100 include elastically deformable beams (See FIG. 2) or planar membranes.

The sparse strain sensor network 110 is configured to measure the local geometry of the deformable material. During deformation, a sparse strain sensor network 110 fastened to the surface of the material 100 will continuously generate variable physical signals in response to the local deformation caused by the network of actuators 120. Suitable sensors for the sparse strain sensor network 110 include strain sensors such as but not limited to strain gauges 130. Strain gauges 130 generate variable signals in response to the compression and expansion inherent to the deformation experienced by the material 100. The sparse strain sensor network 110 may gather information related to the local compression and/or expansion of the material 100. To induce a local compression or expansion a wide variety of actuators 120 may be used. Non-limiting examples of suitable actuators 120 include but are not limited to electrical motors, pneumatic actuators, hydraulic pistons, relays, comb drives, piezoelectric actuators, and thermal bimorphs. Typically the number of sensors within the sparse strain sensor network 110 is at least equal in quantity to the number of actuators within the network of actuators 120.

Linear approximation between the collection of sparse strain sensor data and the plurality of actuator parameter values is assumed. The shape variations of the elastically deformable material 100 are characterized by an appropriate elasticity equation for the object being deformed. The elasticity equations are used to equate the physical behavior of the flexible material 100 as a function of the interaction between the actuators 120 and the material 100. The overall geometry of the material 100 can therefore be measured by using the sparse sensors network 110 as a low complexity model of the physical signals collected from the sparse strain sensor network 110 and the network of actuators 120. The low complexity model is then solved by using complexity reduction and learning methods. Non-limiting examples of suitable complexity reduction and learning methods include basis pursuit and other functional modeling methods.

Figure 2:
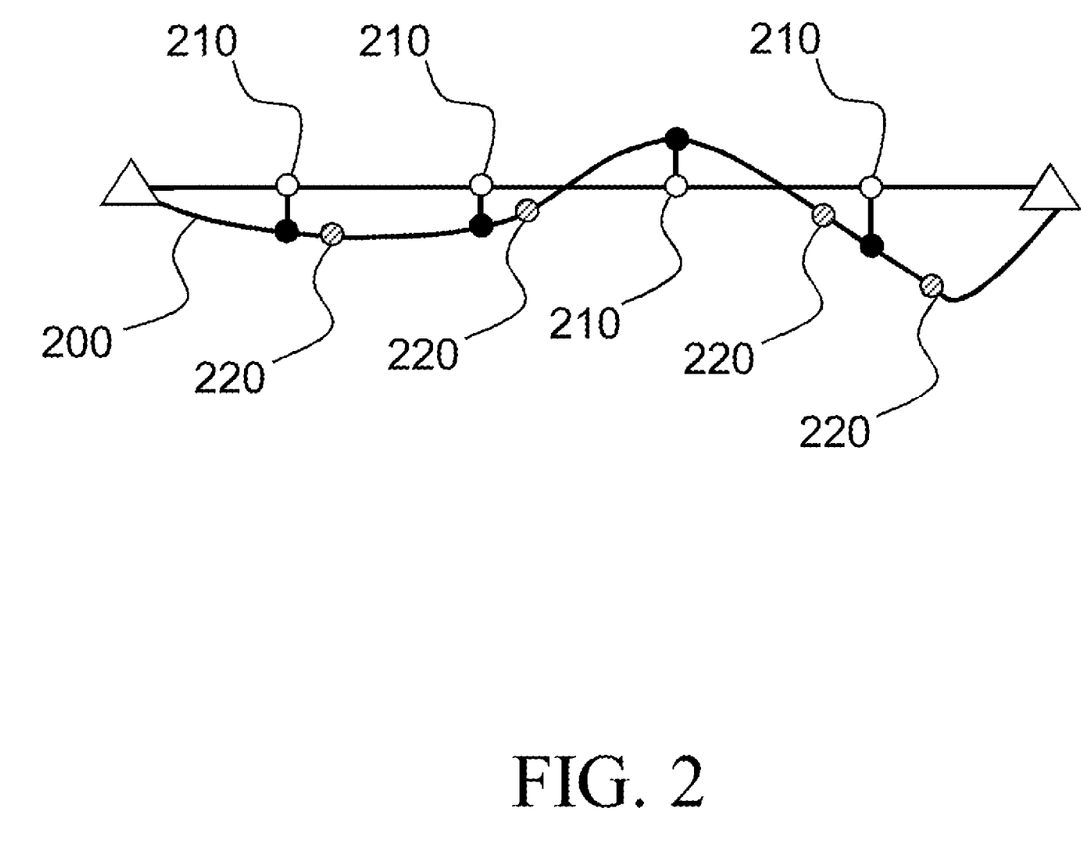
FIG. 2 is an illustration depicting a side perspective of a deformable material in the form of a deformable beam in which the beam is being actively deformed and sensed by a sparse sensor network topology.

Referring to FIG. 2, a two-dimensional representation of an elastically deformable beam 200 is shown. As discussed above, the shape variations of the elastically deformable beam is governed by elasticity equations, a set of partial differential equations (PDEs) that describe the physical behavior of flexible deformable materials as a function of their interaction with external forces, such as actuators 210. For a deformable material, such as an elastically deformed beam 200, the set of PDEs can be simplified to the following equations.

$$EI(x)\frac{d^4 y}{dx^4} = -W(x) \quad (1)$$

$$EI(x)\frac{d^3 y}{dx^3} = S(x) \quad (2)$$

$$EI(x)\frac{d^2 y}{dx^2} = M(x) \quad (3)$$

While it is feasible to solve these equations (1), (2) and (3) for simple geometric objects with simple boundary conditions, generally there is no closed form solution for arbitrarily complex geometries and boundary conditions. One must often resort to restrictive assumptions and non-trivial and extraneous mathematical modeling techniques from functional analysis and shape theory. See, for example, N. I. Akhiezer and I. M. Glazman, Theory of Linear Operators in Hilbert Spaces, Frederick Ungar Publisher, 1966; G. H. Golub and C. F. Van Loan, Matrix Computations, The John Hopkins University Press, p. 601, 1996; and P. Saisan, A. Bissacco, A. Chiuso, and S. Soatto, Modeling and Synthesis of Facial Motion Driven by Speech, Proceedings of ECCV, Prauge, 2004; which are incorporated herein by reference in their entirety. Alternatively, computationally expensive numerical methods akin to finite element methods using highly costly software packages, such as COMSOL, can be used.

The shape of a deformable material can be represented by equation (4) as a continuously deformable (infinite dimensional) variable $r(x)$ with $x \in \Omega$, where $\Omega$ defines the geometry of the deformable material shape, for example, by a network of actuators.

$$r(x) = F(x; \lambda) \quad \text{Equation (4)}$$

with $\lambda \in R^n$ describing the actuator network's geometry and full displacement configuration. Here $F: R^n \to M$ is an invertible mapping and M is an n-dimensional differentiable manifold of $R^\infty$. Given a valid mapping F that fully characterizes the relationship between shape and variation of the boundary conditions, one can estimate the shape of a deformable material with high precision from a sparse sample of strain sensor 220 readings. Models of equation (4) are built from characterization of shapes using parameterization, although other functional modeling methods such as basis pursuit, exponential or polynomial kernels, and neural networks can be used for the functional mapping stage. See, G. Chanan, D. G. Mac Martin, J. Nelson, T. Mast, Control and Alignment of Segmented Mirror Telescopes: Matrices, Modes, and Error Propagation, Applied Optics, Vol. 43, No. 6, February 2004; and Diffeomorphism, en.wikipedia.org/w/index.php?title=Diffeomorphism&oldid=91201524 (last visited Jan. 8, 2007), which are herein incorporated by reference. Additional functional modeling methods and solutions to elasticity equations via Finite Element Analysis Methods can also be used. In general mapping may be accomplished by any one of numerous equivalent alternatives, only some of which are disclosed herein.

A parametric functional representation for $r(x)$ illustrates how an n-strain sensor network performs to recover the geometric shape subsequent to an elastic deformation. To detect the elastic deformation a variety of sensors may be used. A common and inexpensive sensor suitable for measuring local deformation, such as curvature, is a strain gauge 220. However, other types of sensors capable of measuring local deformation may be used as substitute. A strain gauge 220 directly measures the curvature of the material at the point of contact. Typically the curvature of a material at any point is given by equation (5).

Equation (5) [57]

$$K = \left| \frac{(\dot{x}\ddot{y} - \ddot{y}\dot{x})}{\left((\dot{x}^2 + \dot{y}^2)^{3/2}\right)} \right|$$

Here [x,y] represent the points on the beam 200. By assuming small deformations, the curvature of the beam 200 is approximated by using the second derivative of the curve. The second derivative of the curve is given by the parameterization $r=y(x)$, and assuming small $dy/dx$, curvature expressed as equation (6).

$$k = \frac{d^2 r}{dx^2} \qquad \text{Equation (6)}$$

During deformation, the values given by the strain sensor 220 are directly related to the beam 200 shape with $s(x)=G(r(x))$. Given the second derivative approximation of curvature, G is a diffeomorphism between r and s. In mathematics, a diffeomorphism is a kind of isomorphism of smooth manifolds. It is an invertible function that maps one differentiable manifold to another, such that both the function and its inverse are smooth. Formally, given two manifolds M and N, a bijective map f from M to N is called a diffeomorphism if both f: M→N and its inverse $f^{-1}$: N→M are differentiable (if these functions are r times continuously differentiable, f is called a $C^r$-diffeomorphism). Two manifolds M and N are diffeomorphic (symbol being usually ≅) if there is a diffeomorphism f from M to N. See, Diffeomorphism, http://en.wikipedia.org/w/index.php?title=Diffeomorphism&oldid _9120152 4 (last visited Jan. 8, 2007), which is herein incorporated by reference. In the present instance, diffeomorphism assumption is with respect to the fact that r is at least a $C^3$ curve.

Figure 3:
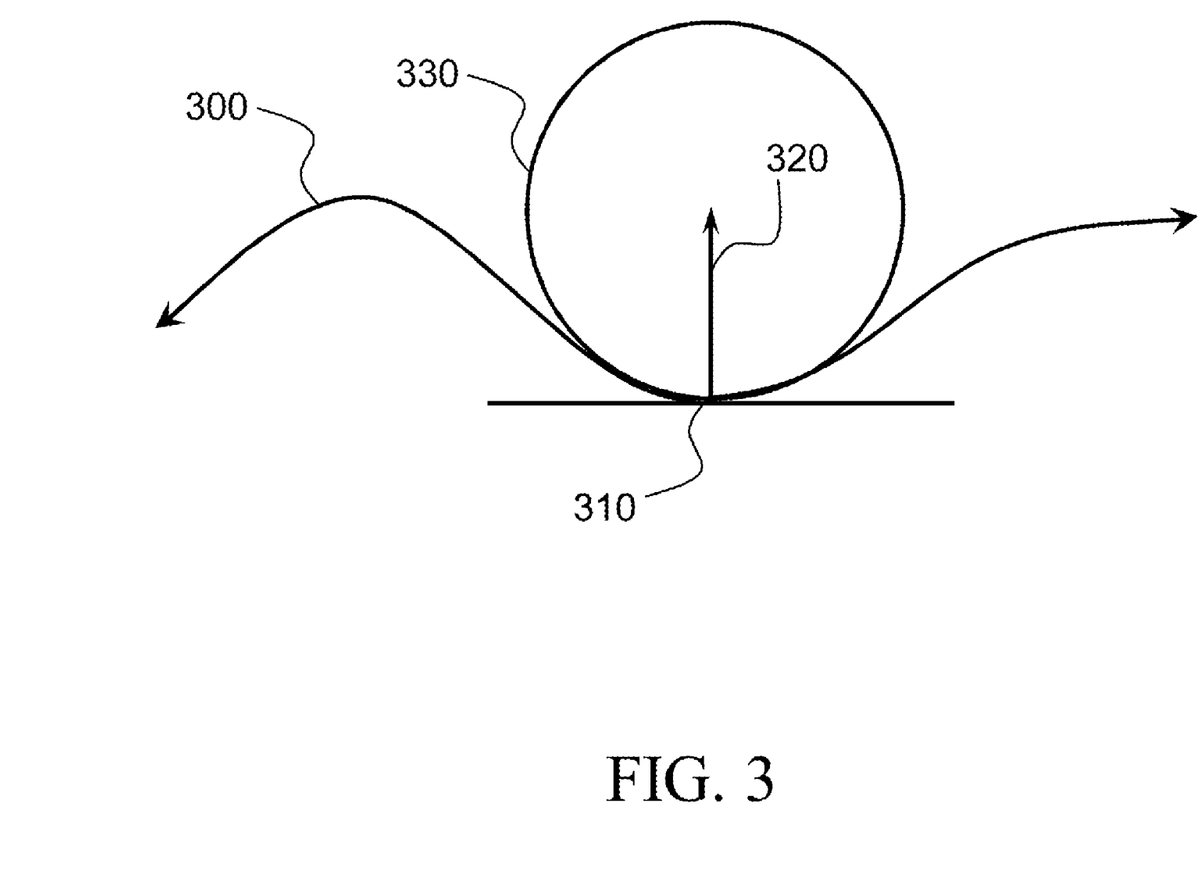
FIG. 3 is an illustration depicting the relationship between the curvature of a curve along a deformable material and the inverse radius of an osculating circle.

Referring to FIG. 3, the curvature of the deformed material 300 at a given point 310 has a magnitude equal to the inverse of the radius 320 of an osculating circle 330 that closely touches a given point 310 on the curve of a deformed material 300. The curvature of the deformed material 300 is a vector pointing in the direction of the circle's center. The smaller the radius 320 of the osculating circle 320, the larger the magnitude of the curvature (1/r) will be. Therefore when a curve is "nearly straight," the curvature will be close to zero, and where the curve undergoes a tight turn, the curvature will be large in magnitude. For a plane curve given parametrically as $c(t)=(x(t),y(t))$ the curvature is given by equation (5). In this example, the curve will be parameterized as $c(x)=(x,r(x))$.

Shape to sensor diffeomorphism combined with equation (4) allows one to construct an n-node sparse sensor network with sufficient complexity characterizing the shapes described by equation (4). Mathematically any n location of sensors $\{x_i\}$ on the beam satisfying $rank([s(x_i)\_k])=n$, with $k>n$ distinct recordings, is sufficient to reconstruct the full shape $r(x)$ from sparse n-sensor readings, $s(x_i)$, where s here is an n-dimensional vector of sensor values.

(2) EXPERIMENTAL RESULTS

Figure 4A:
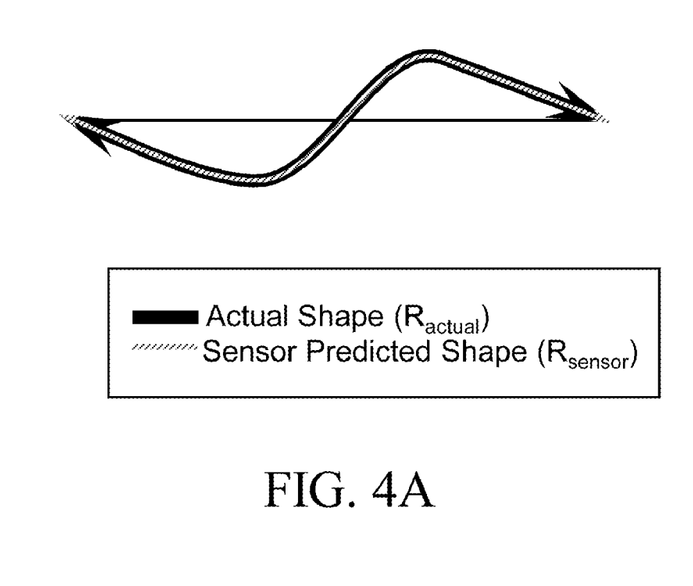
FIG. 4(a)-(c) are schematic diagrams illustrating experimental results comparing the actual shape of a deformable beam and the predicted shape.
Figure 4B:
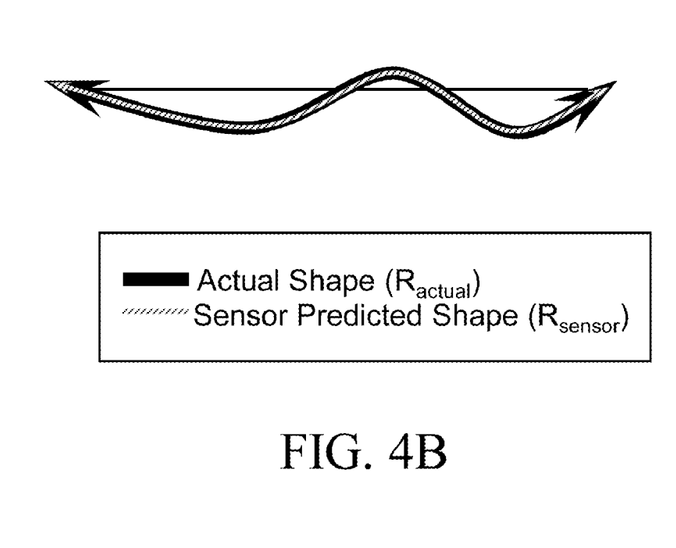
Figure 4C:
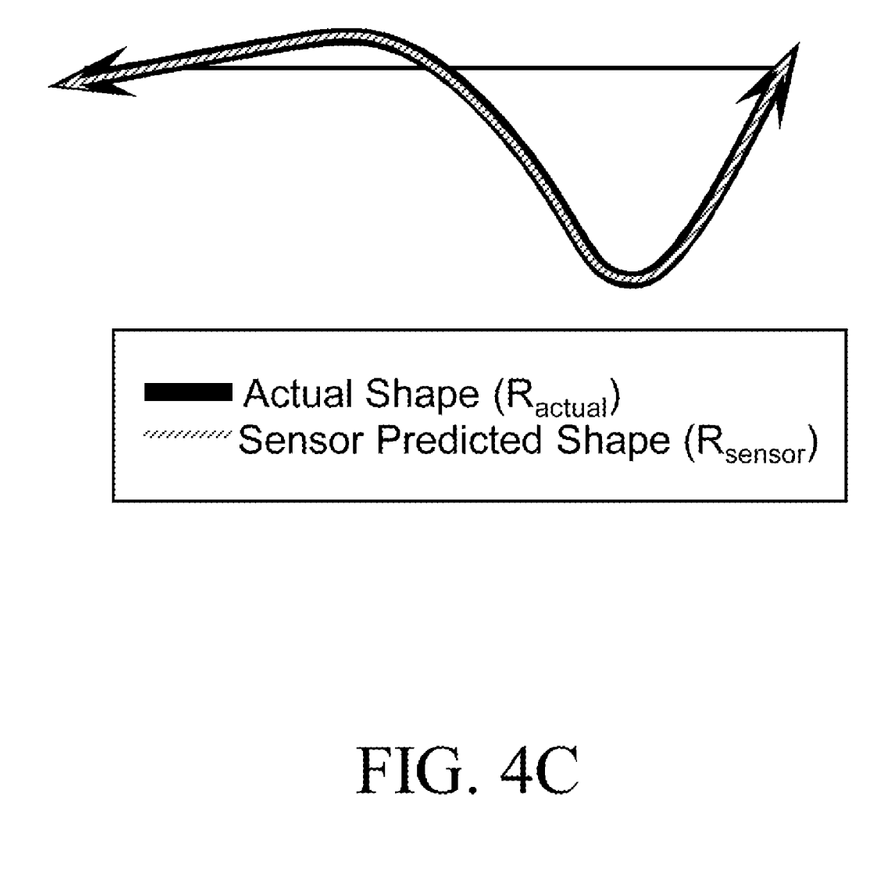

In this section experimental results demonstrating the proposed method in predicting the shape of an elastically deformable beam undergoing deformation using linear actuators. A threshold condition is established where the number of sensors is equal to or less than the number of actuators actively deforming the material. With the number of sensors above the threshold condition, the continuous shape was recovered with 0% error. Results are obtained with varying number of sparse sensor topologies, including different numbers and locations of sensors. With the number of sensors above the threshold condition, the continuous shape of the beam is recovered with 0% error as depicted in FIG. 4(a)-(c). As illustrated in FIG. 4(a)-(c), four (4) sensors 220 (as shown in FIG. 2) are sufficient to recover the shape completely for the exemplary beam control configuration. For this particular exemplary control configuration, four (4) sensors are the minimum required number of sensors for precision shape recovery.

The results, as shown in FIG. 4(a)-(c), on flexible beam models demonstrate the power and efficacy of precision shape recovery from a sparse n-sensor network made up of deformation sensing elements disposed on the surface of an elastically deformable material. The experimental results demonstrate that the mathematical analysis method can correctly predict the shape of a deformable material shaped by a plurality of actuator. In particular, a sparse number of sensors matching the degree of freedom in variation of the boundary values for elasticity equations are sufficient to recover the shape of the flexible beam (shown in FIG. 2) used in this exemplary embodiment.

(3) EMBODIMENTS OF THE PRESENT INVENTION

Figure 5:
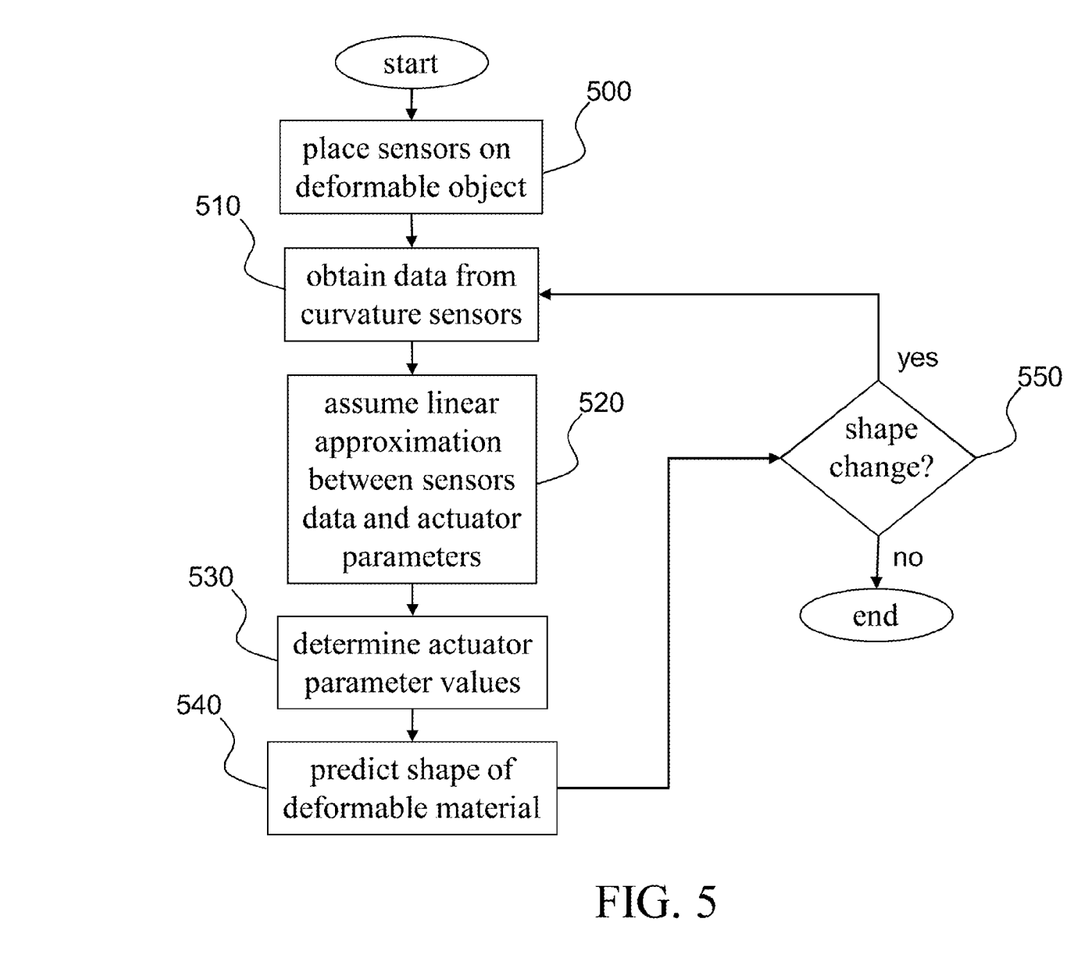
FIG. 5 is a flowchart illustrating an exemplary method for discerning the shape of a deformable material.

FIG. 5 illustrates a flowchart of an exemplary embodiment according to the present invention. After initializing the system, a sparse network of curvature sensors is disposed on the surface of a deformable material 500. In one embodiment, the material may be received with a strain sensor already attached with the material. Typically the number of sensors applied to the surface of the material is at least equal to the number of actuators influencing the geometry of the structure. A network of actuators may then be initialized in order to actively deform the material. During deformation, information related to the local deformation is collected 510. Non-limiting examples of the data collected may include, but is generally not limited to local strain experienced by the material and positional information of the actuators. Further the point of contact between the sparse strain sensor along the surface of the deformable material may also be repositioned in order to generate a collection of sparse strain sensor data. An assumption is made to assist in relating the data collected to the actual geometry of the shape 520. For example, a linear approximation may be assumed to exist between the sensor data and the actuator parameters. The actuator parameters values are also determined from the collection of data obtained from the curvature sensors 530. Non-limiting examples of the data collected may include but is not limited to the positional information of the actuator in either one, two, or three-dimensional space. Ultimately the shape of the deformable material is predicted from the actuator parameters values produced in step 540. In a further embodiment successive controlled deformations may be required in order to achieve a desired shape. In this instance a check is conducted to determine whether a further round of sampling and predicting is required 550. If an additional deformation has or will occur, the process is repeated. In the alternative the process is ended.

Figure 6:
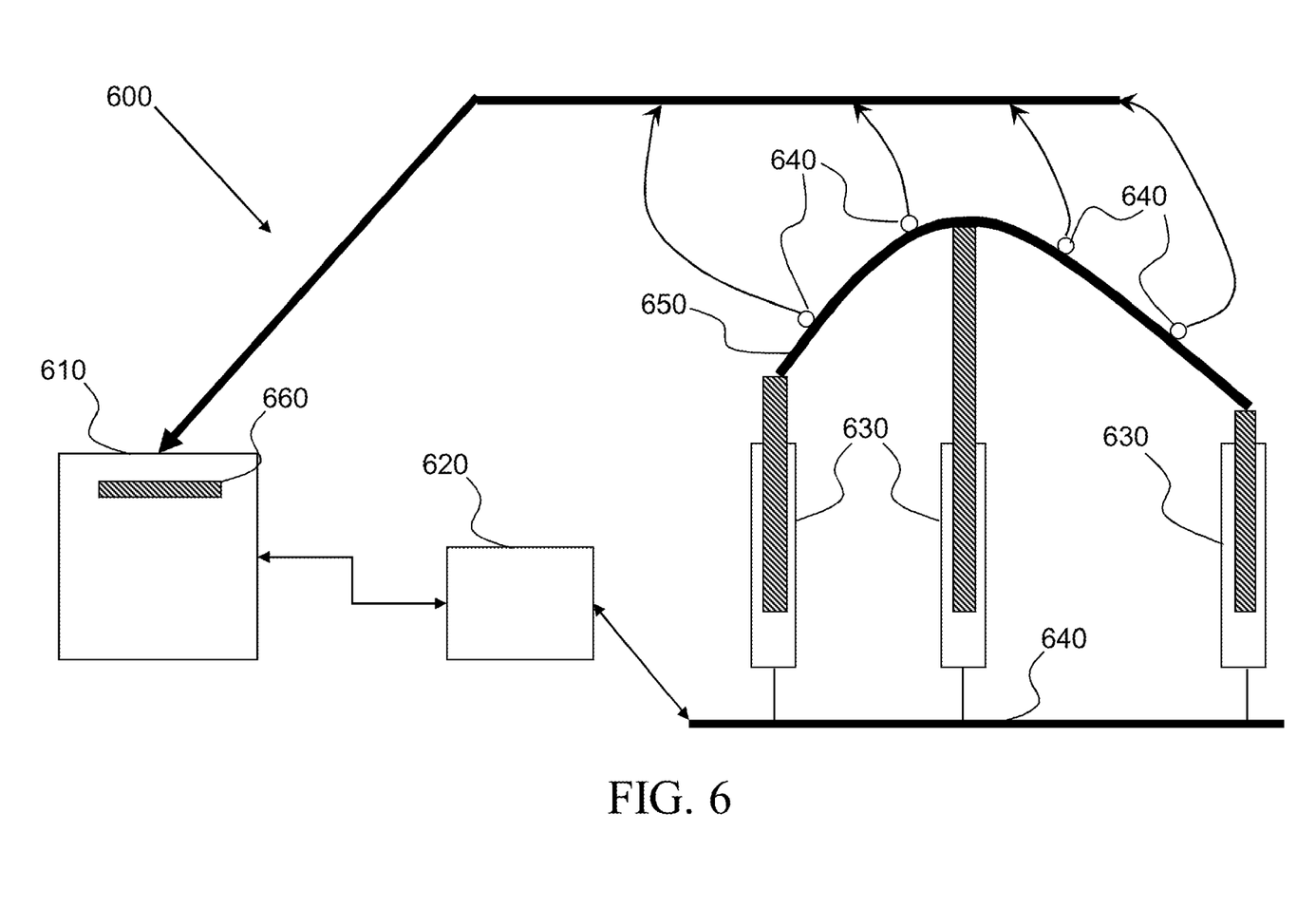
FIG. 6 is a schematic diagram illustrating an exemplary apparatus for precision shape sensing of a deformable material.

Referring to FIG. 6, there is illustrated an exemplary apparatus 600 according to another embodiment of the present invention. The apparatus 600 comprises a processor 610 which is in communication with an actuator control box 620.

The processor 610 may be any device capable of executing sequenced mathematical and/or logical instructions. Nan-limiting examples of such devices are general purpose digital computers, Field Programmable Gate Array (FPGAs), or microcontroller chips. The invention may be embodied on a computer readable medium having contents for causing a computer-based information handling system to perform the steps described herein.

A plurality of actuators 630 are coupled to the actuator control box 620 via an actuator communication bus 640. The processor 610 controls the plurality of actuators 630 via the control box 620. Furthermore, a plurality of curvature sensors 640 are placed on the surface of a deformable material 650 and coupled to the processor 610. The processor 610 receives a collection of data from the curvature sensors 640 representing the local curvatures of the surface of the deformable material 650 under the plurality of curvature sensors 640, wherein the processor 610 executes code, contained on a computer readable medium 660, to estimate the actual shape of the deformable material 650.

The present invention has three "principal" aspects. As described above, the first is a system for sensing and/or deforming a deformable material. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Preferably, the methods disclosed will be embodied in a computer program either by coding in a high level language, or by preparing a plug-in application which is complied. The precision shape sensor described herein is useable as a plug-in supplemental program, as an independent module that may be integrated into any commercially available shape sensing program, or into any information processing device that is capable of modifying and displaying information or representations related to the geometric shape of a deformable material.

Figure 7:
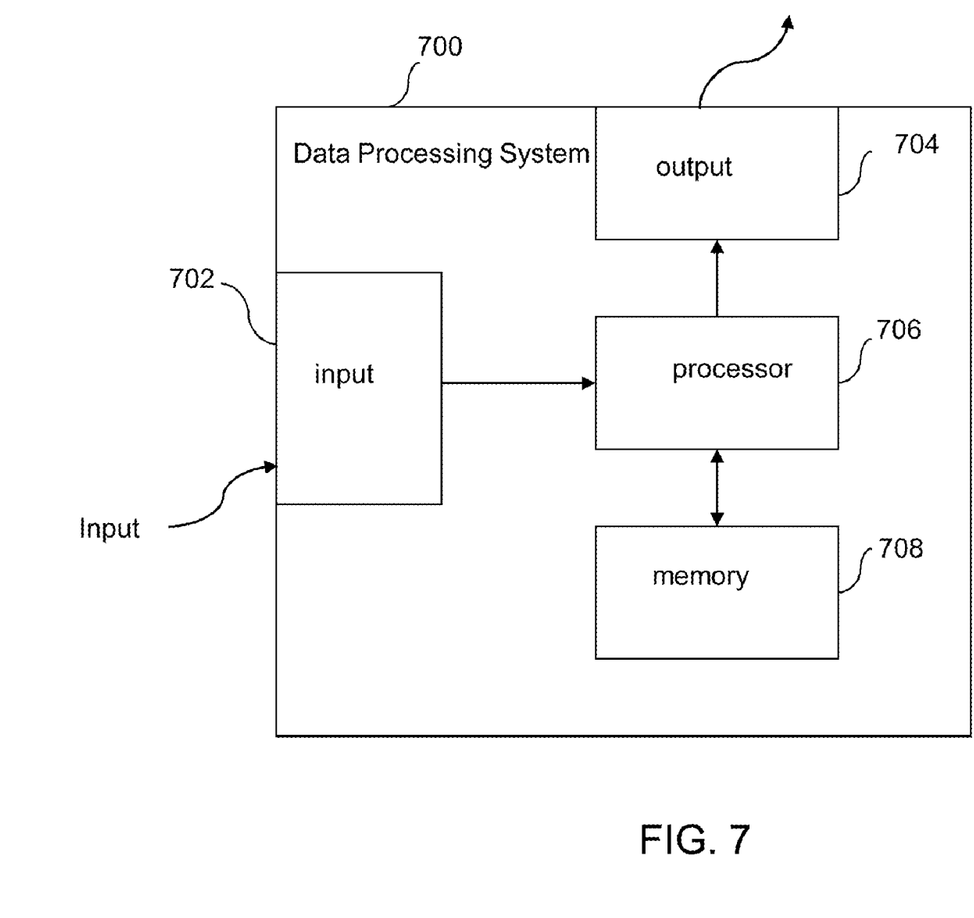
FIG. 7 is a block diagram of a precision shape sensing system according to the present invention.

A block diagram depicting the components of a 3-D imaging system of the present invention is provided in FIG. 7. The image processing system 700 comprises an input 602 for receiving information from at least one sensor (e.g., transducer array) for use in detecting material strain. Note that the input 702 may include multiple "ports." Typically, input is received from at least one sensor, non-limiting examples of which include strain sensors. An output 704 is connected with the processor for providing information regarding the geometric shape of the deformable material to other systems in order that a network of computer systems may serve as processing system. Output may also be provided to other devices or other programs; e.g., to other software modules, for use therein. The input 702 and the output 704 are both coupled with a processor 706, which may be a general-purpose computer processor or a specialized processor designed specifically for use with the present invention. The processor 706 is coupled with a memory block 708 to permit storage of data and software that are to be manipulated by commands to the processor 706. The memory block 708 or data block refers to any possible computer-related information storage structure known to those skilled in the art, including but not limited to RAM, processor cache, hard drive, or combinations of those, including dynamic memory structures.

Figure 8:
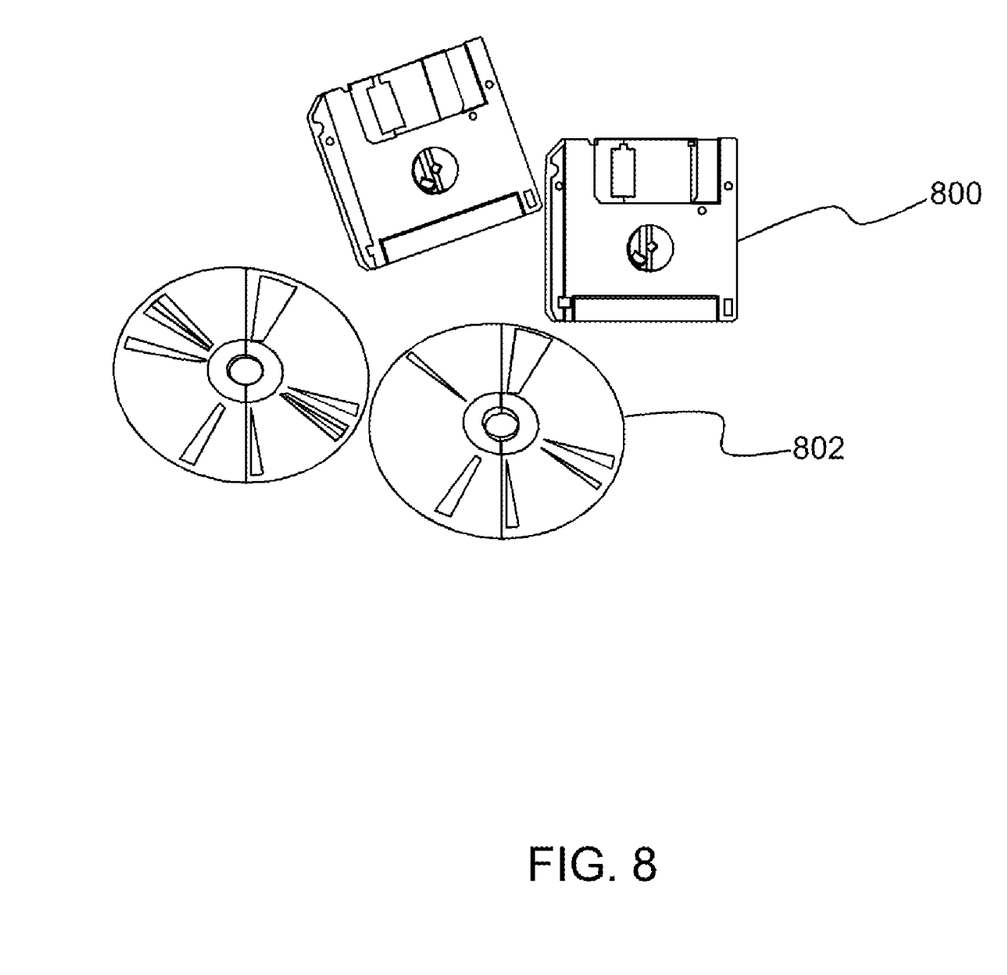
FIG. 8 is illustrative diagram of a computer program product embodying the present invention.

An illustrative diagram of a computer program product embodying the present invention is depicted in FIG. 8. The computer program product is depicted as an optical disk 800 such as a CD or DVD. However, as mentioned previously, the computer program product generally represents computer-readable instructions stored on any compatible computer-readable medium. Any currently existing or future developed computer readable medium suitable for storing data can be used to store the programs embodying the afore-described interface, methods and algorithms, including, but not limited to hard drives, floppy disks 802, digital tape, flash cards, compact discs, and DVDs. The computer readable medium can comprise more than one device, such as two linked hard drives. This invention is not limited to the particular hardware used herein, and any hardware presently existing or developed in the future that permits image processing can be used.

The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising", "comprises" and "comprised" are not intended to exclude other additives, components, integers or steps.

Also, it is noted that the embodiments are disclosed as a process that is depicted as a flowchart, a flow diagram, a structure diagram, or a block diagram. Although a flowchart may disclose various steps of the operations as a sequential process, many of the operations can be performed in parallel or concurrently. The steps shown are not intended to be limiting nor are they intended to indicate that each step depicted is essential to the method, but instead are exemplary steps only.

The term "storage medium" can represent one or more devices for storing data, including read-only memory (ROM), random access memory (RAM), magnetic disk storage mediums, optical storage mediums, flash memory devices, electrical storage mediums or other mediums for storing information in a form readable by a machine such as, for example, a computer.

In the foregoing specification, the invention has been described with reference to specific embodiments thereof. It will, however, be evident that various modifications and changes may be made thereto without departing from the broader spirit and scope of the invention. The specification and drawing are, accordingly, to be regarded in an illustrative rather than a restrictive sense. It should be appreciated that the present invention should not be construed as limited by such embodiments.

From the foregoing description, it will be apparent that the present invention has a number of advantages, some of which have been described herein, and others of which are inherent in the embodiments of the invention described or claimed herein. Also, it will be understood that modifications can be made to the device, apparatus and method described herein without departing from the teachings of subject matter described herein. As such, the invention is not to be limited to the described embodiments except as required by the appended claims.

What is claimed is:

1. A method for discerning a shape of a deformable material being deformed by a plurality of actuators, the method comprising acts of:
obtaining sensor data from a set of sensors, each of the set of sensors having a point of contact with the deformable material surface;
relating the point of contact between each sensor and the deformable material to determine a local geometry of the deformable material at the point of contact;
generating a set of actuator parameter values from the sensor data by assuming an approximate linear relationship between the sensor data and the set of actuator parameter values;
predicting the shape of the deformable material from the set of actuator parameter values; and
adjusting the point of contact of the sensor along the surface of the deformable material to generate a collection of sparse strain sensor data.

2. The method of claim 1, wherein a physical behavior of the deformable material is described as a function of the material's interaction with at least one external force by a set of partial differential equations derived from elasticity equations.

3. The method of claim 1, further comprising an act of utilizing a finite element method to determine a local geometry of the deformable material at each point of contact.

4. The method of claim 1, further comprising an act of utilizing a finite element method to determine a local geometry of the deformable material at each point of contact.

5. A computer program product for discerning the shape of a deformable material, the computer program product comprising computer-readable instruction means stored on a computer-readable medium that are executable by a computer for causing the computer to perform operations of:

obtaining sensor data from a set of sensors, each of the set of sensors having a point of contact with the deformable material surface;

relating the point of contact between each sensor and the deformable material to determine a local geometry of the deformable material at the point of contact;

generating a set of actuator parameter values from the sensor data by assuming an approximate linear relationship between the sensor data and the set of actuator parameter values;

predicting the shape of the deformable material from the set of actuator parameter values; and generating a collection of sparse strain sensor data through adjustment of the point of contact of the sensor along the surface of the deformable material.

6. The computer program product of claim 5, wherein a physical behavior of the deformable material is described as a function of the material's interaction with at least one external force by a set of partial differential equations derived from elasticity equations.

7. The computer program product of claim 6, further comprising an operation of utilizing a finite element method to determine a local geometry of the deformable material at each point of contact.

8. The computer program product of claim 5, further comprising an operation of utilizing a finite element method to determine a local geometry of the deformable material at each point of contact.

9. An apparatus for discerning a shape of a deformable material being deformed by a plurality of actuators, the apparatus comprising:

a means for securing a deformable material;

a set of actuators for deforming a deformable material, the actuators disposed within functional proximity to the deformable material;

a set of curvature sensors, the set of curvature sensors configured to measure a local geometry of the deformable material;

a computing apparatus configured to receive data from the set of curvature sensors and to process the data to determine the shape of the deformable material; and wherein the data is a collection of sparse strain sensor data that is generated through adjustment of a point of contact of the sensors along the surface of the deformable material.

10. The apparatus of claim 9, further comprising an actuator control box configured to adjust a point of contact of the set of actuators with respect to the deformable material.

11. The apparatus of claim 10, wherein the actuator control box is further configured to transmit positional information of the set of actuators to the computing apparatus.

12. The apparatus of claim 11, wherein the set of curvature sensors are strain gauges.

13. The apparatus of claim 9, wherein the actuator control box is further configured to transmit positional information of the set of actuators to the computing apparatus.

14. The apparatus of claim 9, wherein the set of curvature sensors are strain gauges.

\* \* \* \* \*